(12) United States Patent
Kruglick

(10) Patent No.: US 9,311,316 B2
(45) Date of Patent: Apr. 12, 2016

(54) INFRASTRUCTURE IDENTIFICATION OF AVAILABLE PLATFORMS FOR MIGRATION IN PLACE

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/488,453

(22) Filed: Sep. 17, 2014

(65) Prior Publication Data

US 2015/0006628 A1    Jan. 1, 2015

Related U.S. Application Data

(63) Continuation of application No. 13/578,025, filed as application No. PCT/US2012/034178 on Apr. 19, 2012, now Pat. No. 8,880,704.

(51) Int. Cl.
| | |
|---|---|
| G06F 15/167 | (2006.01) |
| G06F 17/30 | (2006.01) |
| G06F 9/50 | (2006.01) |
| G06F 3/06 | (2006.01) |
| H04L 29/08 | (2006.01) |

(Continued)

(52) U.S. Cl.
CPC ........ G06F 17/30079 (2013.01); G06F 3/0647 (2013.01); G06F 9/5072 (2013.01); G06F 17/303 (2013.01); H04L 67/34 (2013.01)

(58) Field of Classification Search
CPC ............ G06F 3/0647; G06F 17/30079; G06F 17/303; G06F 9/5072; H04L 41/50; H04L 67/34
USPC .................................. 709/217, 219, 223, 226
See application file for complete search history.

(56) References Cited

U.S. PATENT DOCUMENTS

| 8,108,456 B2 | 1/2012 | Chen et al. |
| 2005/0044197 A1 | 2/2005 | Lai |

(Continued)

FOREIGN PATENT DOCUMENTS

WO    PCT/US12/34178    10/2013

OTHER PUBLICATIONS

Wikipedia, Device fingerprint, Internet article from http://en.wikipedia.org/wiki/Device_fingerprint, 4 pages, Jul. 2012, modified Sep. 2011.

(Continued)

*Primary Examiner* — Viet Vu
(74) *Attorney, Agent, or Firm* — Jensen & Puntigam, P.S.

(57) ABSTRACT

Technologies related to migration in place are generally described. In some examples, software and/or data associated with a platform customer can be "migrated" to a new platform while allowing the platform customer's software and/or data to remain on same hardware. A data center and/or Infrastructure as a Service (IaaS) provider may be configured to support migration in place for example by providing hardware identifiers upon request, providing platform identifiers upon request, providing platform compatibility information upon request and/or approving platforms for migration in place operations, deploying platform modules to migration in place hardware, providing user session support during migration in place operations, and/or performing security operations.

16 Claims, 7 Drawing Sheets

(56) References Cited

U.S. PATENT DOCUMENTS

| | | |
|---|---|---|
| 2007/0245332 A1 | 10/2007 | Tal et al. |
| 2010/0076615 A1 | 3/2010 | Daniel et al. |
| 2011/0166952 A1 | 7/2011 | Manchikanti et al. |
| 2011/0302569 A1 | 12/2011 | Kunze et al. |
| 2012/0054193 A1 | 3/2012 | Backa |
| 2013/0191534 A1 | 7/2013 | Neuse et al. |
| 2013/0282791 A1 | 10/2013 | Kruglick |

OTHER PUBLICATIONS

Phoenix NAP, Phoenix NAP Launches Secured Cloud Offering, internet article from http://www.datacenterknowledge.com/archives/2011/11/17/phoenixnap-launches-secured-cloud-offering/, 2 pages, Jul. 2012.

Bradford, R., et al, "Live Wide-Area Migration of Virtual Machines Including Local Persistent State," Publication from the 3rd International Conference on Virtual execution environments (ACM, 2007), pp. 169-179, Jun. 2007.

Galloway, Jon, "Can Operating Systems Tell if They're Running in Virtual Machine", Blog article from http://weblogs.asp.net/jgalloway, 10 pages, Oct. 2006.

Ristenpart, T., et al., "Hey, You, Get Off of My Cloud: Exploring Information Leakage in Third-Party Compute Clouds," Publication from 16th ACM Conference on Computer and Communications Security, pp. 199-212, Nov. 2009.

International Searching Authority, International Search Report and Written Opinion of the International Searching Authority for PCT/US12/34178, 15 pages, Jul. 2012.

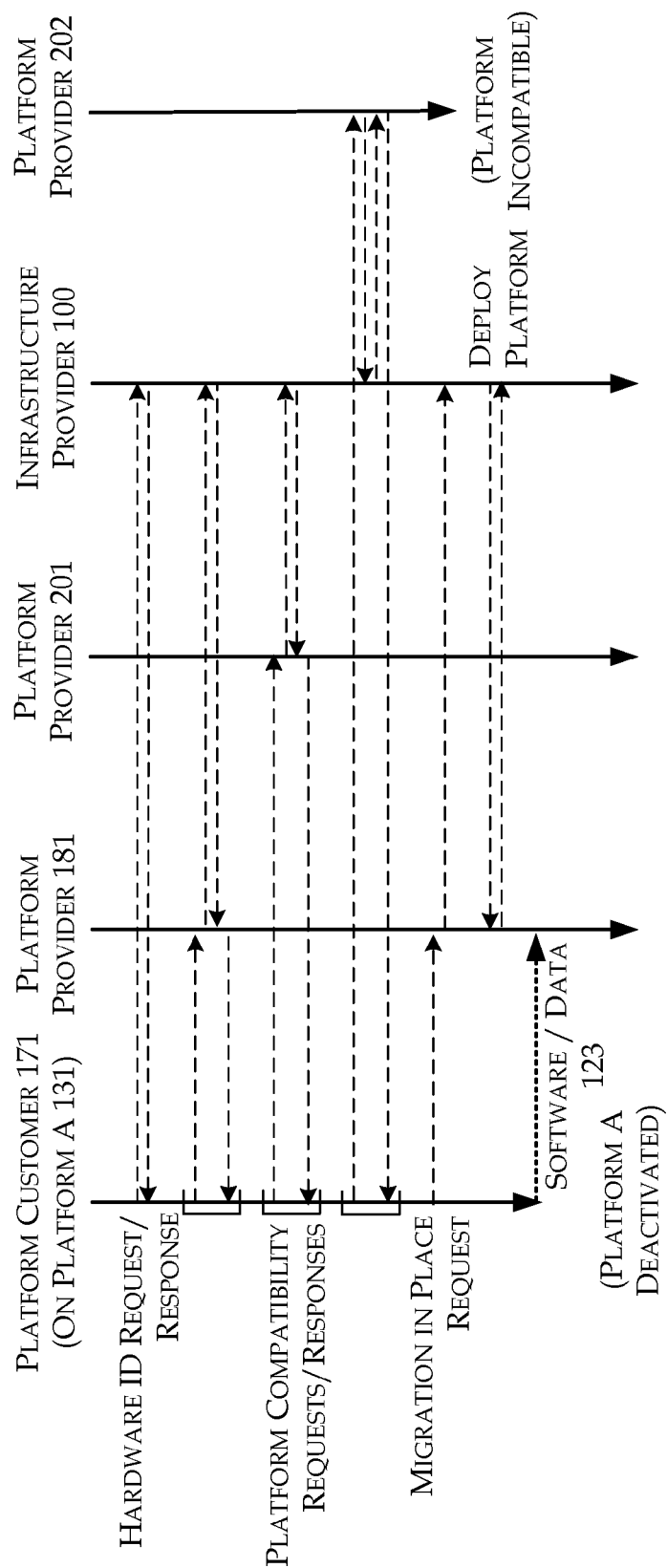

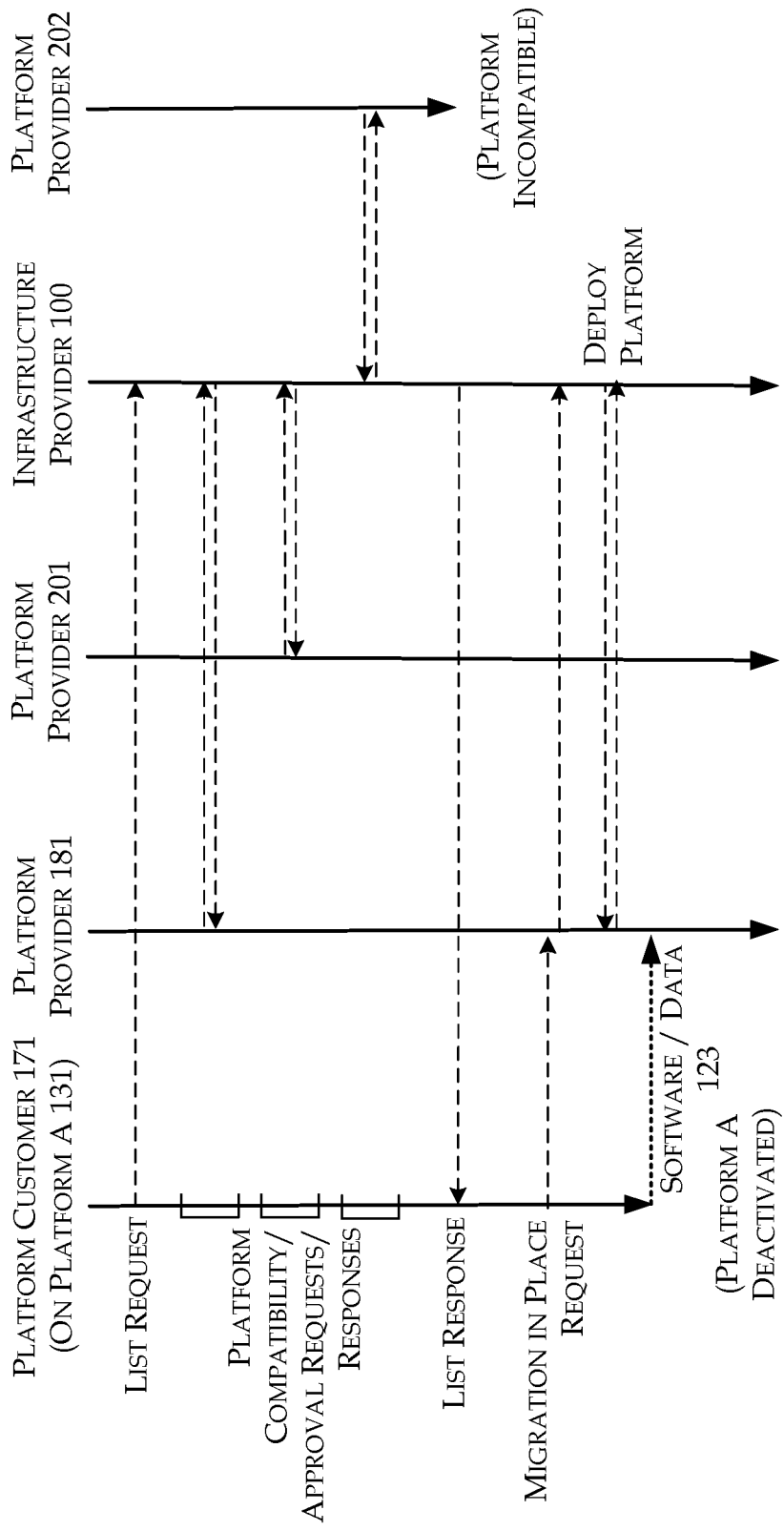

INFRASTRUCTURE IDENTIFICATION OF AVAILABLE PLATFORMS FOR MIGRATION IN PLACE

CROSS-REFERENCE TO RELATED APPLICATIONS

This is a continuation claiming priority under 35 U.S.C. §120 of U.S. patent application Ser. No. 13/578,025 entitled "MIGRATION IN PLACE BY INFRASTRUCTURE DEPLOYMENT OF PLATFORMS TO CUSTOMER HARDWARE", filed on Aug. 9, 2012, now U.S. Pat. No. 8,880,704, which is a National Stage Application under 35 U.S.C. §371 of PCT Application No. PCT/US12/34178, entitled "MIGRATION IN PLACE", filed on Apr. 19, 2012.

BACKGROUND

Unless otherwise indicated herein, the materials described in this section are not prior art to the claims in this application and are not admitted to be prior art by inclusion in this section.

Mainstream computer use is evolving from individually managed, stand-alone computing devices to connected devices that access software and/or data via a network connection. "Cloud computing" refers to a computing model in which computing resources may be accessed via a network connection, and resources available from the network may be referred to as "in the cloud".

Behind a network connection, a "cloud" may often comprise professionally managed hardware and software. A data center operator may supply hardware infrastructure itself, e.g., racks and rows of servers within a physical structure and comprising processors, memory, cabling, and cooling systems. In some cases, one or more "Infrastructure as a Service" (IaaS) providers may supply an infrastructure layer using the data center operator's hardware. IaaS providers may supply, for example, servers (as physical machines and/or virtual machines), raw storage, firewalls, load balancers, and networks, from the IaaS provider's pool of such resources within a data center. Data center operators and IaaS providers both provide hardware infrastructure and are both referred to herein as "infrastructure providers".

One or more "Platform as a Service" (PaaS) providers, or "platform providers", may supply a platform layer on infrastructure provider hardware. Platform providers may supply, for example, computing platforms such as operating systems, programming language execution environments, databases, and web servers.

One or more platform customers including, e.g., businesses and/or individuals, may store software and data on a selected platform provider's platform. An example platform customer may comprise, e.g., a business engaging in ecommerce activities. Another example platform customer may comprise, e.g., a "Software as a Service" (SaaS) provider who supplies a software layer using a platform provider's platform. SaaS providers may supply, for example, application software that can be made available in a cloud to users.

Customers or entities accessing a platform customer's software/data "in the cloud" may be referred to as "cloud clients" or "users". Therefore, in an example arrangement, infrastructure providers may sell cloud infrastructure to platform providers, platform providers may sell cloud platforms to platform customers, and platform customers may sell their goods/services to users accessing the cloud.

SUMMARY

The present disclosure generally describes technologies including devices, methods, and computer readable media relating to migration in place. Some example methods may comprise providing hardware identifiers to support migration in place. Methods configured to provide hardware identifiers may provide, for example, information identifying data center/IaaS hardware having software and/or data associated with an identified platform customer upon request. Example methods may include providing hardware comprising a plurality of servers for use by platform providers, wherein the platform providers are associated with platform customers, and wherein the platform customers are associated with platform customer data stored on one or more of the servers; receiving a hardware identification request comprising a platform customer identification, e.g., from the identified platform customer or a platform provider, wherein the hardware identification request comprises a request to identify servers comprising customer data associated with an identified platform customer of a first platform provider; and providing, in response to the hardware identification request, hardware identifier(s) corresponding to server(s) comprising customer data associated with the identified platform customer. In some embodiments, a User Interface (UI) or Application Programming Interface (API) may be provided for the purpose of receiving and/or responding to the hardware identification request. In some embodiments, hardware identifier(s) may identify any number of servers at a data center at a particular physical location, including for example all servers at a physical location or a subset thereof, such as a server row, a server rack, or one or more specific servers within a data center.

Some example methods may comprise providing platform identifiers to support migration in place. Methods configured to provide platform identifiers may provide, for example, information identifying platforms available at data center/IaaS hardware having software and/or data associated with an identified platform customer upon request. Example methods may include providing hardware comprising a plurality of servers at a physical location for use by platform providers, each platform provider being associated with platform customers and wherein platform customer software and/or data is stored on the servers at the physical location; receiving a migration in place list request comprising a platform customer identification, e.g., from the identified platform customer or a platform provider; and providing, in response to the migration in place list request, a migration in place list corresponding to the identified platform customer, wherein the provided migration in place list identifies platform providers that are available to the identified platform customer without migrating the identified platform customer's software/data outside of the physical location. The migration in place list may identify platform providers that are available to the identified platform customer without migrating outside of a data center at the physical location, or without migrating outside out of a subset of the hardware within the data center, such as a server row, server rack, or one or more specific servers within the data center. In some embodiments, a UI or an API may be provided for the purpose of receiving the migration in place list request.

Some example methods may comprise providing platform compatibility information to support migration in place. Methods configured to provide platform compatibility information may provide platform compatibility information defining platform compatibility of one or more platforms with hardware identified in a platform compatibility request, for determinations of platform provider compatibility with data center/IaaS hardware. Example methods may include receiving a platform compatibility request comprising one or more hardware identifiers, determining, in response to the platform compatibility request, whether server(s) corresponding to the hardware identifier(s) identified in the platform compatibility request meet criteria associated with a platform provider identified in the request, or determining compatibility properties of the server(s) corresponding to the hardware identifier(s), and providing, in response to the platform compatibility request, platform compatibility information. Platform compatibility information may comprise a grant or denial of approval for migration in place and/or properties of one or more servers identified by the hardware identifiers in the platform compatibility request.

Some example methods may comprise deploying platform modules to migration in place hardware to support migration in place. Methods configured to deploy platform modules to migration in place hardware may deploy new platform modules, e.g., platform modules associated with an identified platform provider, to data center/IaaS hardware in response to a request from a platform customer or platform provider. Example methods may include receiving a migration in place request comprising a request to deploy platform service modules of an identified platform provider to servers comprising platform customer data associated with an identified platform customer; and deploying, in response to the migration in place request, platform service modules of the identified platform provider to the servers comprising platform customer data associated with the identified platform customer. Deployed platform service modules may then perform migration operations to migrate the identified platform customer's software and/or data to the identified platform provider's platform.

Some example methods may comprise providing user session support during migration in place operations. Example methods may support using sessions by directing service calls to a new platform, e.g., platform modules associated with an identified platform provider, as a migration in place operation is carried out. An increasing number of service calls associated with an identified platform customer may be directed to a platform provided by the identified platform provider as the identified platform customer's data is migrated to the identified platform provider's platform.

Some example methods may comprise performing security operations to support migration in place. Example methods may mask provided hardware identifiers to prevent data center mapping or cloud cartography attacks. In some embodiments, hardware identifiers provided in response to hardware identification requests may comprise temporary-use and/or otherwise limited-use hardware identifiers, as described herein. Each of the methods may be combined with some or all of the others.

Computing devices and computer readable media having instructions for performing the various methods described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a server comprising a processor, a memory, and one or more migration support modules such as hardware identification request service modules, migration in place list request service modules, platform compatibility request servicing modules, migration in place deployment modules, appropriate UI and/or API modules, security modules, and SBC modules, configured to perform aspects of the above-described methods, as described in further detail herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2 is a diagram illustrating example interactions between a platform customer, various platform providers, and an infrastructure provider in embodiments wherein the infrastructure provider is configured to provide hardware identifiers to support migration in place;

FIG. 3 is a diagram illustrating example interactions between a platform customer, various platform providers, and an infrastructure provider in embodiments wherein the infrastructure provider is configured to provide platform identifiers to support migration in place;

DETAILED DESCRIPTION

Figure 1A:
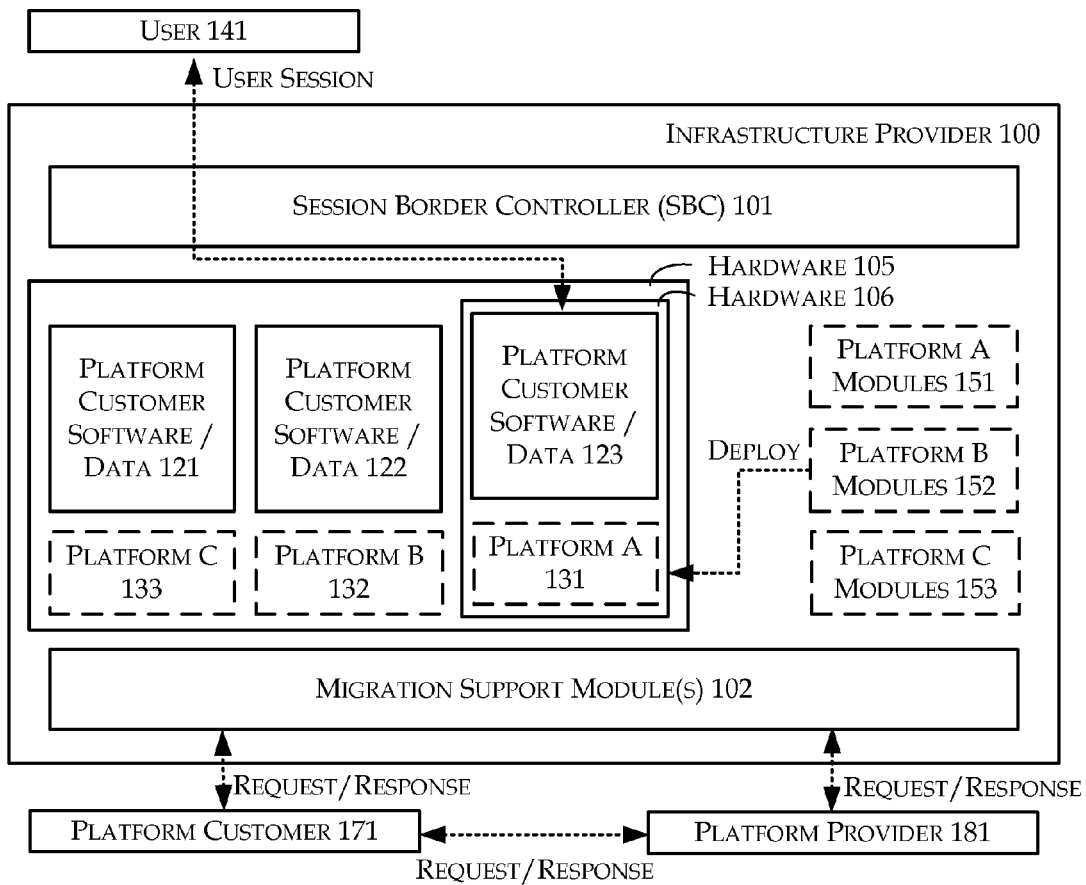
FIG. 1A is a block diagram illustrating an example infrastructure provider, platform customer, platform provider, and user in a first state.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to migration in place. In some examples, software and/or data associated with a platform customer can be "migrated" to a new platform while allowing the platform customer's software and/or data to remain on same hardware. An infrastructure provider may be configured to support migration in place for example by providing hardware identifiers upon request, providing platform identifiers upon request, providing platform compatibility information upon request, deploying platform modules to identified hardware, providing user session support during migration in place operations, and/or performing security operations.

Figure 1B:
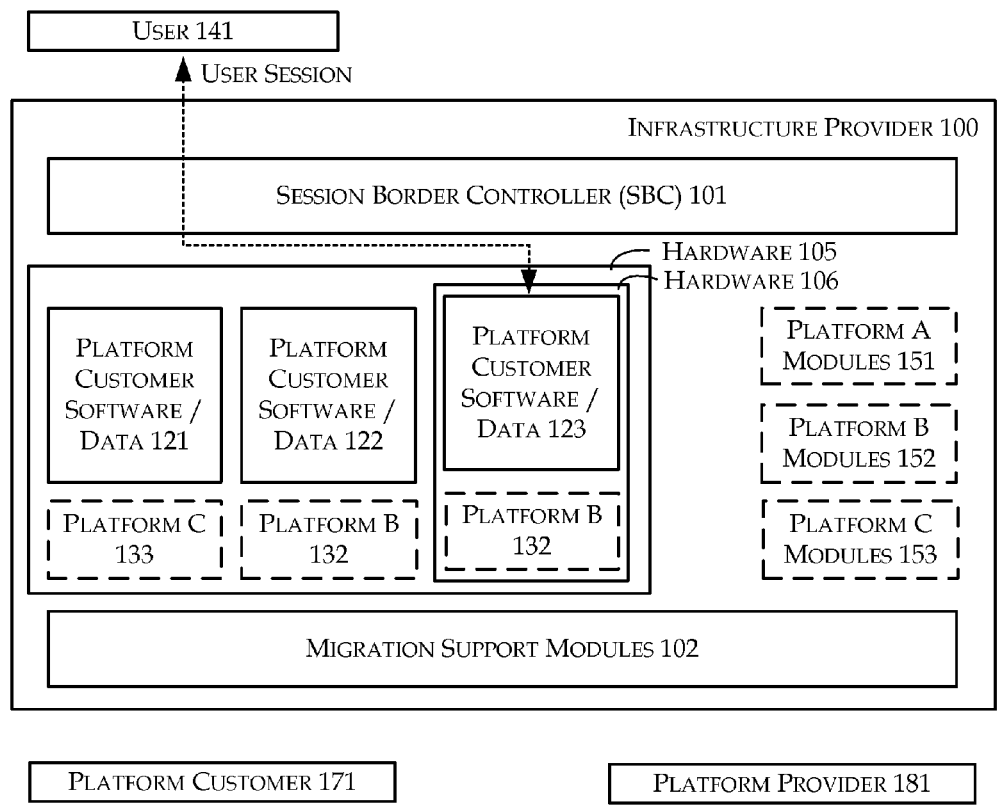
FIG. 1B is a block diagram illustrating an example infrastructure provider, platform customer, platform provider, and user in a second state.

FIGS. 1A and 1B are block diagrams illustrating an example infrastructure provider 100, a platform customer 171, a platform provider 181, and a user 141, arranged in accordance with at least some embodiments of the present disclosure. FIGS. 1A and 1B may be referred to collectively as FIG. 1. In FIG. 1, infrastructure provider 100 comprises SBC 101, migration support modules 102, platform A modules 151, platform B modules 152, platform C modules 153, and hardware 105. Hardware 105 comprises platform customer software/data 121 on a platform C 133, platform customer software/data 122 on a platform B 132, and hardware 106. In FIG. 1A, hardware 106 comprises platform customer software/data 123 on a platform A 131. In FIG. 1B, hardware 106 comprises platform customer software/data 123 on platform B 132.

In examples described herein with reference to FIG. 1, platform customer software/data 123 is associated with platform customer 171, e.g., software/data 123 may be owned by platform customer 171. Platform B 132 and platform B modules 152 are associated with platform provider 181, e.g., may be owned by platform provider 181, while platform A 131 and platform A modules 151 may be associated with a different platform provider from platform provider 181, and platform C 133 and platform C modules 153 may also be associated with a different platform provider from platform provider 181. Platform customer software/data 123 may be referred to as identified software/data 123, because software/data 123 may be identified for a migration in place operation. Similarly, platform customer 171 may be referred to as identified platform customer 171, because platform customer 171 may be identified for a migration in place operation, and platform provider 181 and/or platform B 132 may be referred to as identified platform provider 181 and identified platform, respectively, because platform provider 181 and/or platform B 132 may be identified as providing a target platform to which identified software/data 123 migrates pursuant to a migration in place operation.

FIG. 1A illustrates infrastructure provider 100 in a first state, and interactions between infrastructure provider 100, platform customer 171, platform provider 181, and user 141. Connections between infrastructure provider 100, platform customer 171, platform provider 181, and user 141 may be implemented by any network connection technology, e.g., connections over the Internet. Interactions between infrastructure provider 100 and platform customer 171, between infrastructure provider 100 and platform provider 181, and between platform customer 171 and platform provider 181 may comprise request and response interactions as discussed further with reference to FIG. 2 and FIG. 3.

Interactions between infrastructure provider 100 and user 141 may comprise user session interactions as normally carried out between cloud clients such as user 141, and data center hardware 105, 106 as may be provided by infrastructure provider 100. SBC 101 may be configured to dynamically direct service calls within a user session to an identified platform, such as platform B 132, instead of a first platform, e.g., platform A 131, as a migration in place operation is performed. The identified platform may also be referred to herein as a second platform, a new platform, or a selected platform.

FIG. 1A also illustrates deployment of platform B modules 152 to hardware 106, to perform a migration in place operation wherein identified software/data 123 is migrated from first platform A 131 to identified platform B 132. FIG. 1B illustrates infrastructure provider 100 in a second state, in which identified software/data 123 is supported by platform B 132, and SBC 101 may be configured to direct service calls within a user session with user 141 to platform customer software/data 123 on platform B 132.

In some embodiments, migration in place operations may comprise migrating identified software/data 123 from a first platform, such as platform A 131 as shown in FIG. 1A, to a second platform, such as platform B 132 as shown in FIG. 1B, while identified software/data 123 remains on same hardware, e.g., hardware 106. In some embodiments "same hardware" may comprise any subset of hardware within a same physical location as hardware 106 having identified software/data 123. Therefore, remaining on same hardware may comprise, in some embodiments, remaining on hardware 106, hardware 105, or any hardware operated by infrastructure provider 100 in a same physical location, such as a same building, as hardware 106. In some embodiments, remaining on same hardware may comprise remaining on a same specific server or servers, remaining on a same rack of servers, remaining in a same row of servers, or remaining in a same data center at a same physical location as a specific server or servers having platform customer software/data 123. However, for the purpose of simplifying the explanations herein, embodiments in which migration in place comprises platform customer software/data 123 remaining on hardware 106 are described. Hardware 106 may therefore be referred to as identified hardware 106, because hardware 106 may be identified as hardware where identified software/data 123 will remain before, during, and after a migration in place operation. In some embodiments, "same hardware" may comprise any subset of hardware connected to hardware 106 via a non-public network, e.g., a network operated by infrastructure provider 100 for the exclusive use of infrastructure provider 100.

Allowing identified software/data 123 to remain on identified hardware 106 while migrating to a new platform is advantageous from a security perspective, as it does not expose platform customer software/data to side-channel attacks and/or other security risks inherent in migrating platform customer software/data to different hardware. In some circumstances, migration in place may also have other advantages such as reducing unexpected errors due different hardware environments before and after migration.

Multiple different platform providers may offer platform services supported by infrastructure provider 100 hardware. For example, a first platform provider (not shown in FIG. 1) may offer platform A 131, which may be deployed in hardware 106 for a platform customer by platform A modules 151, a second platform provider 181 may offer platform B 132, which may be deployed in hardware 105 for a platform customer by platform B modules 152, and a third platform provider (not shown in FIG. 1) may offer platform C 133, which may be deployed in hardware 105 for a platform customer by platform C modules 153. Platforms A 131, B 132, and C may all make use of infrastructure provider hardware 105. For example, multiple PaaS providers may operate within a single IaaS facility.

Different platform providers may offer different business models, pricing, and types of engagement despite the fact that they use same hardware. For example a platform provider that serves primarily small startups may allow fine grain control but have minimal customer support and minimal site-to-site synchronization or content delivery services. A platform provider for large multisite companies, meanwhile, may offer a focus on deterministic multi-site data availability and in-house systems integration experts and consulting services for a business model that is focused on support consulting. In further contrast a platform provider for online merchant operations may have less reason to offer consulting as their users are computer-savvy but may have a strong focus on fast response times and efficient load balancing and payment processing. Each of these three scenarios sees a platform provider investing in different services for their platform customers and platform customers may evolve through needing different platform providers over time. A platform customer may begin needing the platform provider for small startups, evolve into needing the platform provider for large multisite as it becomes a larger corporate project, and finally change to needing platform provider for online merchant operations as it becomes a successful business with many customers.

Some embodiments of this disclosure provide technologies for platform customer 171 to determine platform providers that can be deployed on same infrastructure provider hardware, e.g., hardware 106. Some embodiments may furthermore provide technologies for migration in place in which platform customer software/data 123 may run on same hardware 106 before and after migration between platform providers by moving the applicable platforms, not the platform customer software/data 123. In some embodiments, migration in place enables a lifecycle model in which a growing company can be passed among platform providers who specialize in different levels of customer support and scaling, all without ever having to be concerned about unpredictable impacts of applications handling changes to new hardware, memory models, or network architectures. Security issues are also minimized because the platform customer software/data 123 need not be transferred between hardware. Also, in some embodiments a platform customer may build an in-house cloud, so that platform customer 171 and infrastructure provider 100 are controlled by a same company or other entity. Platform customer 171 may take advantage of a succession of platform provider services and offer excess infrastructure provider 100 capacity to the market so that sensitive data never leaves the building, hardware subset, or specific servers reserved for platform customer 171.

In some embodiments, migration support modules 102 may be configured to allow platform customer 171 to select a platform provider, e.g., among providers of platform A 131, B 132, and C 133, while platform customer software/data 123 associated with platform customer 171 remains within infrastructure provider 100, and optionally with a subset of hardware provided by infrastructure provider 100, such as hardware 105, or within a specific server provided by infrastructure provider 100, such as hardware 106. Hardware ID references and storage dealiasing may be employed to allow platform customer 171 to find a platform provider who offers identified hardware 106. An identified platform provider 181 may be selected by platform customer 171 to launch on identified hardware 106 within infrastructure provider 100. Identified software/data 123 may be migrated to platform B 132 of identified platform provider 181 without transporting identified software/data 123 off of identified hardware 106. In some cases, migration in place operations may be carried out without stopping deployment function of identified software/data 123, as described further herein.

FIG. 2 is a diagram illustrating example interactions between a platform customer, various platform providers, and an infrastructure provider in embodiments wherein the infrastructure provider is configured to provide hardware identifiers to support migration in place, arranged in accordance with at least some embodiments of the present disclosure. Platform customer 171 may wish to switch from a first platform, e.g., platform A 131, to a new platform, but platform customer 171 may want platform customer software/data 123 to remain on same hardware if possible. In hardware identifier embodiments according to FIG. 2, platform customer 171 may send a hardware identification request to infrastructure provider 100. The hardware identification request may comprise a request to identify servers comprising platform customer software/data 123. Migration support modules 102 at infrastructure provider 100 may be configured to receive the hardware identification request and to provide, in response to the hardware identification request, one or more hardware identifiers corresponding to hardware 106 comprising platform customer software/data 123.

Platform customer 171 may send platform compatibility requests to platform providers 181, 201, and 202. A platform compatibility request may comprise hardware identifiers received from infrastructure provider 100 in response to the hardware identification request, along with a request for determination of whether platforms provided by platform providers 181, 201, and 202, can be deployed identified hardware, in this example, hardware 106. Platform providers 181, 201, and 202 may in turn send platform compatibility requests to infrastructure provider 100. Platform compatibility requests sent from platform providers 181, 201, and 202 to infrastructure provider 100 may optionally comprise additional information such as platform compatibility requirements and/or requests for specified properties of hardware 106 to facilitate platform provider compatibility determinations. Platform compatibility requests may also provide an identification of platform provider and/or platform, for use in determining platform compatibility. Migration support modules 102 at infrastructure provider 100 may be configured to provide platform compatibility information in response to platform compatibility requests, comprising, e.g., properties of hardware 106 and/or platform approvals/denials. Platform providers 181, 201, and 202 may optionally make compatibility determinations based on provided platform compatibility information, and may respond to platform customer 171 with platform approvals/denials. In FIG. 2, a platform provided by platform provider 202 is determined to be incompatible with hardware 106, and so platform provider 202's response to platform customer 171 may indicate incompatibility, while responses from platform providers 181, 201 may indicate approval/compatibility with hardware 106. In some embodiments, platform customer 171 may send platform compatibility requests directly to infrastructure provider 100, and infrastructure provider may likewise respond directly to platform customer 171.

Platform customer 171 may select a compatible platform or platform provider for a migration in place operation, in this example, identified platform B 132 provided by identified platform provider 181. Platform customer 171 may send a migration in place request to identified platform provider 181, or directly to infrastructure provider 100, requesting infrastructure provider 100 to deploy identified platform B 132 to identified hardware 106 comprising identified software/data 123. Migration support modules 102 at infrastructure provider 100 may be configured to receive the migration in place request from platform customer 171 or platform provider 181 and to deploy, in response to the migration in place request, identified platform B modules 152 of identified platform provider 181 to identified hardware 106. Platform B modules may be retrieved from platform provider 181 or from a previously stored memory within infrastructure provider 100. Platform B modules 152 may be configured to install identified platform B 132 on identified hardware 106, and to optionally carry out migration operations effective to migrate identified software/data 123 to identified platform B 132.

FIG. 3 is a diagram illustrating example interactions between a platform customer, various platform providers, and an infrastructure provider in embodiments wherein the infrastructure provider is configured to provide platform identifiers to support migration in place, arranged in accordance with at least some embodiments of the present disclosure. Platform customer 171 may have platform customer software/data 123 supported by platform A 131, which is provided by a first platform provider (not shown in FIG. 1). Platform customer 171 may wish to switch to a new platform, but may want platform customer software/data 123 to remain on same hardware if possible, as described above. Platform customer 171 may send a migration in place list request to infrastructure provider 100, requesting a migration in place list that identifies platform providers that are available to platform customer 171 without migration of identified software/data 123 outside of its same physical location, e.g., without migration outside the same hardware as currently used for identified software/data 123, in this example, hardware 106. Migration support modules 102 may be configured to receive the migration in place list request, to determine identified hardware 106 used for identified software/data 123, to determine platform compatibility of a plurality of platform providers with identified hardware 106, and to provide to platform customer 171 a migration in place list corresponding to platform customer 171, namely, a list that identifies platform providers that can be deployed to identified hardware 106. Determining platform compatibility may comprise platform compatibility information exchanges with platform providers 181, 201, 202, similar to those described above, and including for example hardware properties of hardware 106, and platform compatibility requirements of platforms provided by the various platform providers. In some embodiments, infrastructure provider 100 need not inform platform customer 171 or platform providers 181, 201, 202 that platform customer software/data 123 is deployed on identified hardware 106.

In FIG. 3, as in FIG. 2, platform customer 171 may select a compatible platform or platform provider for a migration in place operation, for example, platform B 132 provided by platform provider 181. Platform customer 171 may send a migration in place request to identified platform provider 181, or directly to infrastructure provider 100, requesting infrastructure provider 100 to deploy identified platform B 132 to hardware comprising identified software/data 123. In embodiments wherein platform customer 171 does not have a hardware identifier for hardware 106, platform customer 171 may request migration in place and infrastructure provider 100 may determine identified hardware for a migration in place operation. Migration support modules 102 at infrastructure provider 100 may be configured to receive the migration in place request from platform customer 171 or platform provider 181 and to deploy, in response to the migration in place request, platform B modules 152 of identified platform provider 181 to identified hardware 106, as described above.

Figure 4:
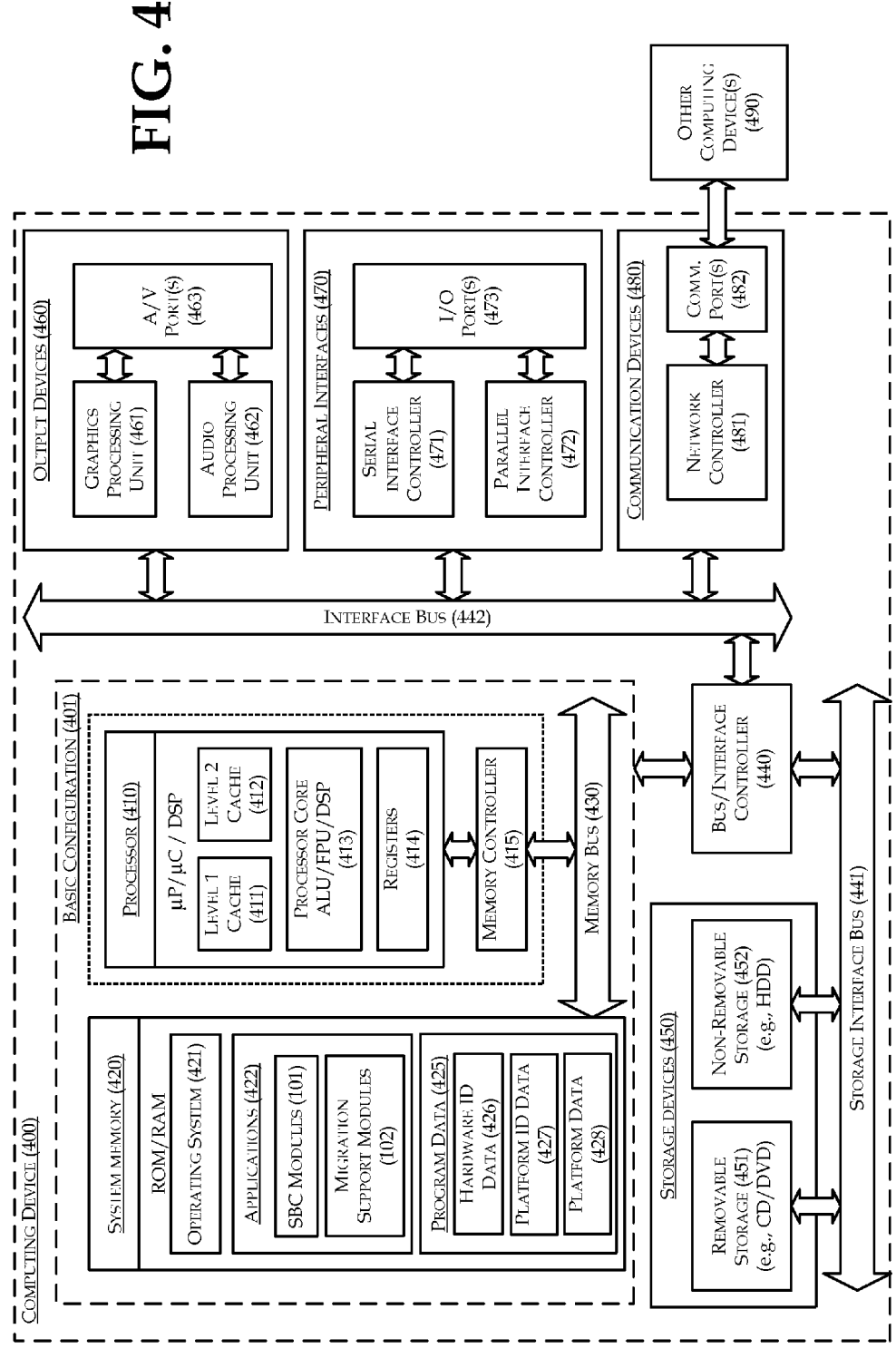
FIG. 4 is a diagram illustrating a computing device as one example of an infrastructure provider server.

FIG. 4 is a diagram illustrating a computing device as one example of an infrastructure provider server, arranged in accordance with at least some embodiments of the present disclosure. In a very basic configuration 401, computing device 400 may include one or more processors 410 and system memory 420. A memory bus 430 may be used for communicating between the processor 410 and the system memory 420.

Depending on the desired configuration, processor 410 may be of any type including but not limited to a microprocessor (µP), a microcontroller (µC), a field programmable gate array (FPGA), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP Core), or any combination thereof. A memory controller 415 may also be used with the processor 410, or in some implementations the memory controller 415 may be an internal part of the processor 410.

Depending on the desired configuration, the system memory 420 may be of any type including but not limited to volatile memory (such as RAM), non-volatile memory (such as ROM, flash memory, etc.), or any combination thereof. System memory 420 typically includes an operating system 421, one or more applications 422, and program data 425. Applications 423-224 may include, for example, SBC module(s) 101 and migration support module(s) 102. Program data 425 may include hardware ID data 426, platform ID data 427, and platform data 428 that may be used by applications 423-224. As described in further detail herein, SBC module(s) 101 and migration support module(s) 102 may be configured to support a variety of migration in place operations. Hardware ID data 426 may comprise tables listing platform customers and corresponding hardware within infrastructure provider 100. Platform ID data 427 may comprise tables listing hardware within infrastructure provider 100 and platform providers that are compatible with such hardware. Platform data 428 may comprise for example, compatibility information comprising hardware properties of hardware within infrastructure provider 100, and platform modules configured to deploy platforms to hardware, such as platform A, B, and C modules 151, 152, 153.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 420, removable storage 451, and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 400. Any such computer storage media may be part of computing device 400.

Computing device 400 may also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which may be configured to communicate to various external devices such as a display or speakers via one or more A/V ports 463. Example peripheral interfaces 470 may include a serial interface controller 471 or a parallel interface controller 472, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 473. Other conventional I/O devices may be connected as well such as a mouse, keyboard, and so forth. An example communication device 480 includes a network controller 481, which may be arranged to facilitate communications with one or more other computing devices 490 over a network communication via one or more communication ports 482.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 400 may be implemented as one or more administration servers in an infrastructure provider 100. Administration servers may be configured to support interactions with platform customers and platform providers, and optionally to provide SBC 101 to support user sessions with infrastructure provider hardware such as 105. In some embodiments, administration servers may be configured independently of hardware 105, and administration servers may be reserved for administrative functions rather than used by platform customer software/data 121, 122, 123. Of course, it will be appreciated that infrastructure provider may provide any configuration of servers to provide administrative functions such as those provided by SBC modules 101 and migration support modules 102.

Figure 5:
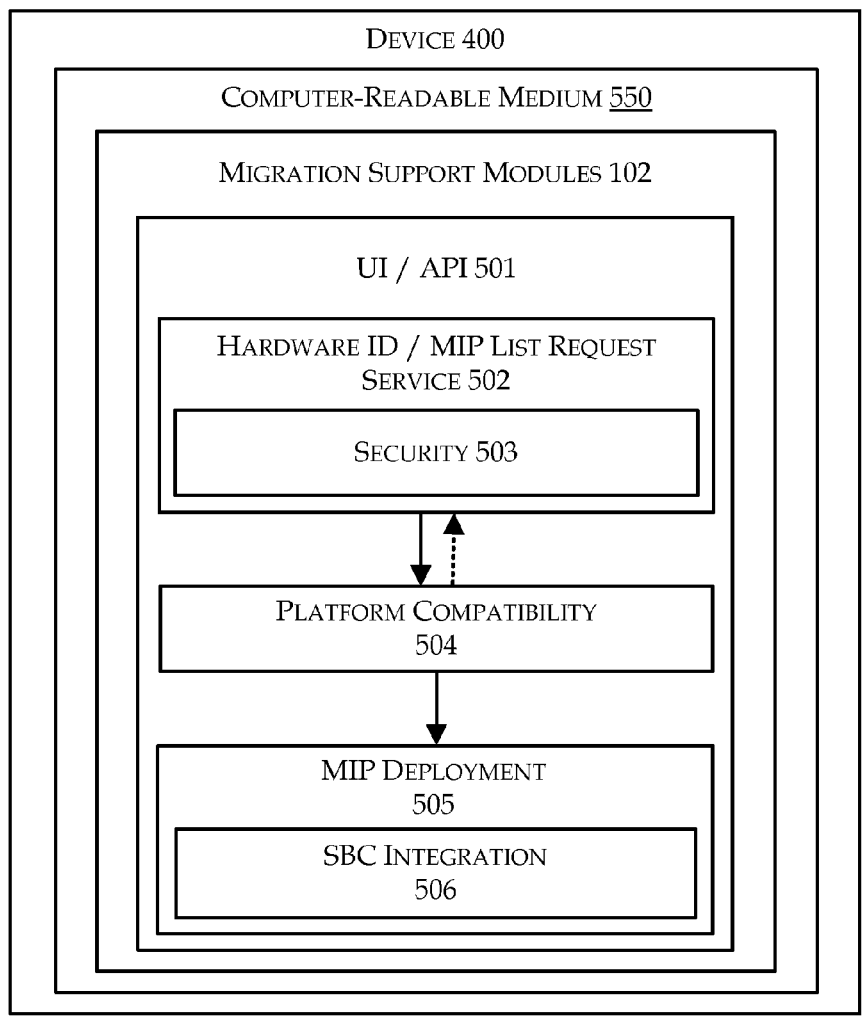
FIG. 5 is a flow diagram illustrating an example method that may be performed by an infrastructure provider server device.

FIG. 5 is a flow diagram illustrating an example method that may be performed by an infrastructure provider server device 400, arranged in accordance with at least some embodiments of the present disclosure. The example flow diagram may include one or more operations/modules as illustrated by blocks 102 and 501-506, which represent operations as may be performed in a method, functional modules in a server device 400, and/or instructions as may be recorded on a computer-readable medium 550. The illustrated blocks 102 and 501-505 may be arranged to provide functional operations corresponding to one or more of "Migration Support Modules" at block 102, "UI/API" at block 501, "Hardware ID/MIP List Request Service" at block 502, "Security" at block 503, "Platform Compatibility" at block 504, "MIP Deployment" at block 505, and/or "SBC Integration" at block 506.

In FIG. 5, blocks 102 and 501-506 are illustrated as being performed sequentially, with block 102 providing block 501, block 501 providing blocks 502, 504, and 505, block 502 providing block 503, and block 505 providing block 506. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 5 illustrates an example method by which infrastructure provider 100 may support migration in place through "Migration Support Modules" at block 102, configured to interact with platform customer 171 and/or platform provider 181, as shown in FIG. 2 and/or FIG. 3, to provide either hardware IDs or migration in place lists to facilitate selection of platform providers by platform customer 171, and to deploy a selected platform pursuant to a migration in place request.

In a "UI/API" block 501, one or more UI and/or API modules may be configured to receive incoming requests via a network, and to provide responses to received requests. Incoming requests may comprise, for example, hardware ID requests, migration in place list requests, platform compatibility requests, and/or migration in place deployment requests. Block 501 may be configured to pass received requests to one or more of blocks 502-505, or to otherwise initiate operations of one or more of blocks 502, 504, and/or 505 in response to received requests. Block 501 may be configured provide responses to received requests, including response data generated by blocks 502-506, to a network, e.g., to a platform customer, platform customer application, or platform provider that initiated a request.

It will be appreciated that numerous UI and API configurations are possible and in general, UI and API configurations may comprise human and/or computer operable controls configured to interact with human users and applications, respectively. UI and API configurations may be configured to provide output data comprising response information, which may be configured for display in a UI or for consumption by a calling application. Block 501 may for example implement an API configured to receive HTTP GET and/or POST commands Block 501 may for example implement a Domain Name Server (DNS) address that routes to an API function for any platform customer or platform provider to use.

In some embodiments, a UI/API provided by block 501 may comprise a variety of controls allowing platform customers and/or platform providers to manage their relationships with an infrastructure provider. For example, block 501 may be configured to support control, display and/or retrieval of billing history, account information, service levels and other aspects of a business relationship. Migration in place support according to blocks 502-506 may comprise an aspect or feature provided by block 501 among various other features of a comprehensive relationship/account management UI/API. Block 501 may receive a hardware ID request or migration in place list request, and block 501 may be configured to initiate block 502.

In a "Hardware ID/MIP List Request Service" at block 502, received hardware ID requests and/or migration in place list requests may be processed and corresponding responses may be generated. Embodiments configured to receive hardware ID requests may receive hardware ID requests from platform customers and/or platform providers. A hardware ID request may comprise a request to identify hardware, such as servers, server racks, server rows, or other subsets of servers at a physical location, comprising software/data associated with an identified platform customer of a first platform provider. Similarly, embodiments configured to receive migration in place list requests may receive migration in place list requests from platform customers and/or platform providers. A migration in place list request may comprise a request to identify platforms or platform providers compatible with hardware, such as servers, server racks, server rows, or other subsets of servers at a physical location, comprising identified software/data associated with a platform customer of a first platform provider.

Block 502 may be configured to determine hardware IDs in response to hardware ID requests. A variety of technologies may be used to determine hardware IDs. In some embodiments, an infrastructure provider 100 may maintain tables mapping platform providers and platform customer software/data to specific hardware. Determining appropriate hardware IDs may be accomplished by looking up a platform provider and/or platform customer in a table. Tables mapping platform providers and platform customer software/data to specific hardware may be maintained for example by assigning hardware IDs to hardware subsets at a physical location, and assigning different platform providers/platform customers to different subsets of hardware. In some embodiments, a subset of hardware may correspond to all hardware at a particular physical location, and different hardware IDs may be used for hardware at different physical locations. In some embodiments, hardware IDs may thus correspond to all hardware at a data center, or to server rows, server racks, or specific servers within a data center.

In some embodiments configured to determine hardware IDs in response to hardware ID requests, block 502 may be configured to identify hardware using MAC IDs or chip serial numbers. In some embodiments, block 502 may be configured to deploy a virtual machine (VM) instance configured to detect its own Internet Protocol (IP) address. For example, a VM may be deployed to hardware having platform customer software/data corresponding to a hardware ID request. The VM may be configured to access a Dom 0 IP address and/or to extract the VM's own internal IP address as a hardware ID. A Dom 0 IP address may be a unique and stable virtual machine manager identifier, and therefore the VM may be configured to access a Dom 0 IP address as a hardware ID. The VM's own internal IP address may also provide a durable hardware ID for use in some embodiments. Embodiments employing the VM's own internal IP address as a hardware ID may perform the method steps of FIG. 5 in a time less than a lifetime of the VM used to detect a hardware ID. Regardless of technique used to detect a hardware ID, the VM may be configured to report a detected hardware ID to block 501. Variants of the approaches described above may also allow platform customers to acquire hardware IDs without infrastructure provider support. For example, platform customer 171 may configure its own VM to detect and report hardware IDs, using a Dom 0 IP address and/or a VM's own internal IP address.

In some embodiments configured to determine hardware IDs in response to hardware ID requests, block 502 may include block 503. "Security" block 503 may be configured to alter hardware IDs, e.g., by converting hardware IDs into temporary-use hardware IDs, platform customer specific hardware IDs, or otherwise limited use hardware IDs, which limited-use hardware IDs may be mapped to permanent hardware IDs. Limited-use hardware IDs may be generated with an algorithmic relationship to permanent hardware IDs (for example related or hashed from a MAC ID or chip serial number). Block 503 may thereby prevent releasing permanent hardware IDs or information that can otherwise be used for data center mapping and cloud cartography type attacks. In some embodiments, block 503 may be configured to use a simple lookup table to relate pseudo-random unique hardware IDs with each piece of hardware. Block 502 may use the hardware IDs provided by block 503 to return different hardware IDs to each different platform customer or platform provider who requests a hardware ID and/or to associate different sets of hardware IDs with responses to each hardware ID request.

In embodiments configured to provide hardware IDs, platform compatibility operations of block 504 may be performed in one or more subsequent interactions, after interactions of block 502, with a platform customer or platform provider. In embodiments configured to provide migration in place lists, discussed below, block 502 may be configured to interact with block 503.

Block 502 may be configured to determine platforms or platform providers compatible with identified hardware in response to migration in place list requests. In embodiments configured to respond to migration in place list requests, block 502 may be configured to determine hardware IDs corresponding to a platform customer as described above. Block 502 may additionally interact with block 504 to determine platform compatibility with identified hardware. Compatible platforms may be compiled into a migration in place list and provided to a requesting platform customer or platform provider in response to a migration in place list request. Block 502 may be followed by block 504.

In a "Platform Compatibility" block 504, migration support modules 102 may be configured to determine platform compatibility with identified hardware, e.g., hardware 106 associated with identified platform customer 171 within infrastructure provider 100. Block 504 may determine platform compatibility with identified hardware by retrieving hardware properties, retrieving platform provider hardware interoperability requirements, and comparing retrieved hardware properties against retrieved hardware interoperability requirements. In some embodiments, platform compatibility determinations may be compiled into tables, which tables may be referenced by block 504. In some embodiments, block 504 may be configured to make platform compatibility determinations in real time in response to platform compatibility requests, e.g., from platform customer 171, platform provider 181, and/or block 502.

In some embodiments, block 504 may be configured to interact with platform customer 171 and/or platform provider 181. For example, block 504 may be configured to receive a platform compatibility request via a network, the platform compatibility request comprising hardware IDs and optionally a platform provider identification. Block 504 may be configured to check whether identified hardware meets any known platform requirements for the identified platform provider, and to provide, in response to the platform compatibility request, platform compatibility information defining platform compatibility of one or more platforms with identified hardware. In some embodiments, platform compatibility information may take the form of a compatibility approval or denial. Alternatively, block 504 may be configured to determine all available platform providers available for identified hardware, and to provide a migration in place list in response to a compatibility request.

In some embodiments, block 504 may be configured to interact with block 502, for example by receiving hardware IDs from block 502 and providing, in response, a migration in place list to block 502. In some embodiments, block 504 may be configured to supply hardware properties corresponding to identified hardware, to facilitate, for example, platform provider compatibility determinations. A platform provider may make its own determinations regarding platform compatibility based upon hardware properties received from block 504, in response to a platform compatibility request. Block 504 may be followed by block 505.

In a "Migration In Place (MIP) Deployment" block 505, migration support modules 102 may be configured to receive a migration in place request, the migration in place request comprising a platform provider identification, and to deploy, in response to the migration in place request, platform service modules of an identified platform provider. For example, platform customer 171 or platform provider 181 may send a migration in place request to block 505. Block 505 may be configured to initiate or otherwise allow a migration in place operation pursuant to the migration in place request. In a migration in place operation, platform service modules of an identified platform provider, e.g., a platform provider that is selected as an identified new platform for a platform customer, may be deployed to hardware such as one or more servers at a same physical location as the platform customer's software and data, to enable migrating the platform customer's software/data from a platform provided by a first platform provider to a platform provided by the identified platform provider. Migrating customer software and data between platform providers may be done using any of a variety of techniques and technologies currently in existence or as may be developed in the future, with the exception that data transport steps performed in migration operations may be largely omitted. The new identified platform provider may be provided with a valid network address for a storage location of platform customer software/data (which may be made available through storage APIs and/or via infrastructure provider storage) and the identified platform provider can launch new platform VM images on the same hardware as the platform customer's software/data, which VMs may use the platform customer's software/data from its present location. Deployment VM launches can be done within a same row or rack as an existing platform customer deployment, for example, or can even take over the same exact servers using the methods herein. Block 505 may be followed by block 506.

In a "SBC Integration" block 506, migration support modules 102 may be configured to interact with SBC 101. Block 506 may be configured to notify SBC 101 of a migration to a new platform and/or configure SBC 101 to direct service calls to the new platform. In some embodiments, block 506 may be configured to notify SBC 101 when a migration is underway, enabling SBC 101 to direct an increasing number of service calls associated with platform customer 171 to platform B 132 as the migration is carried out.

Figure 6:
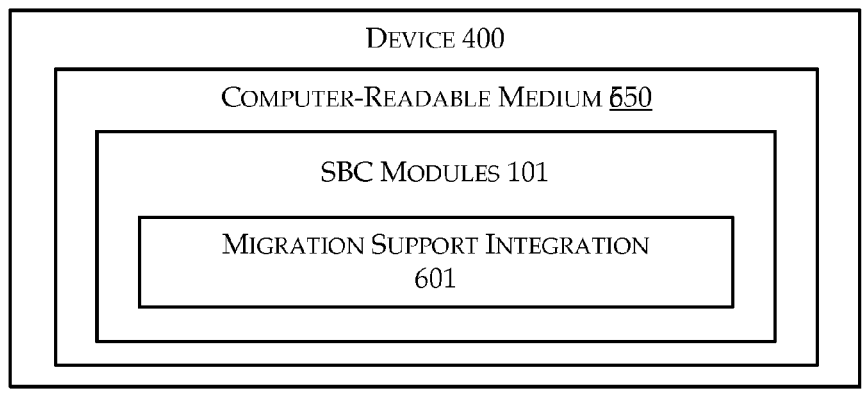
FIG. 6 is a block diagram illustrating example SBC modules that may be configured within an infrastructure provider server device.

FIG. 6 is a block diagram illustrating example SBC modules that may be configured within an infrastructure provider server device 400, arranged in accordance with at least some embodiments of the present disclosure. In some embodiments, an infrastructure provider server device implementing FIG. 6 may comprise one or more separate devices as those implementing FIG. 5, as will be appreciated. However, since both FIG. 5 and FIG. 6 are implemented with computing devices, they are both designated as a device 400. The block diagram includes one or more operations/modules as illustrated by blocks 101 and 601, which represent operations as may be performed in a method, functional modules in a server device 400, and/or instructions as may be recorded on a computer readable medium 650. The illustrated blocks 101 and 601 may be arranged to provide functional operations corresponding to one or more of "SBC Modules" at block 101, and/or "Migration Support Integration" at block 601.

In FIG. 6, blocks 101 and 601 are illustrated as being performed sequentially, with block 101 providing block 601. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

In a "SBC Modules" block 101, SBC 101 may be configured to generally perform any SBC operations known in the art or as may be developed in the future. SBC 101 may support user session interactions between a platform customer software/data 123 and users such as 141, directing user session service calls to various different services provided among platform customer software/data 123, while maintaining overall user session state. Block 101 may be configured to incorporate block 601.

In a "Migration Support Integration" block 601, SBC 101 may be configured to receive notifications and/or configuration commands from block 506, as described above. Block 601 may configure SBC 101, in response to received notifications/commands, to direct service calls in any live user sessions, e.g., with user 141, to platform customer software/data 123 on identified platform B 132, as shown in FIG. 1B, as platform customer software/data 123 migrates to platform B 132. In some embodiments, block 601 may be configured to direct an increasing number of service calls associated with platform customer 171 to platform B 132, provided by identified platform provider 181, as the platform customer's software/data 123 is migrated to the platform B 132 provided by identified platform provider 181. As platform B 132 takes control of increasing segments of platform customer's software/data 123 during a migration operation, SBC 101 may be configured to direct increasing numbers of service calls to platform B 132, until migration is complete and all service calls can be directed to platform B 132.

Figure 7:
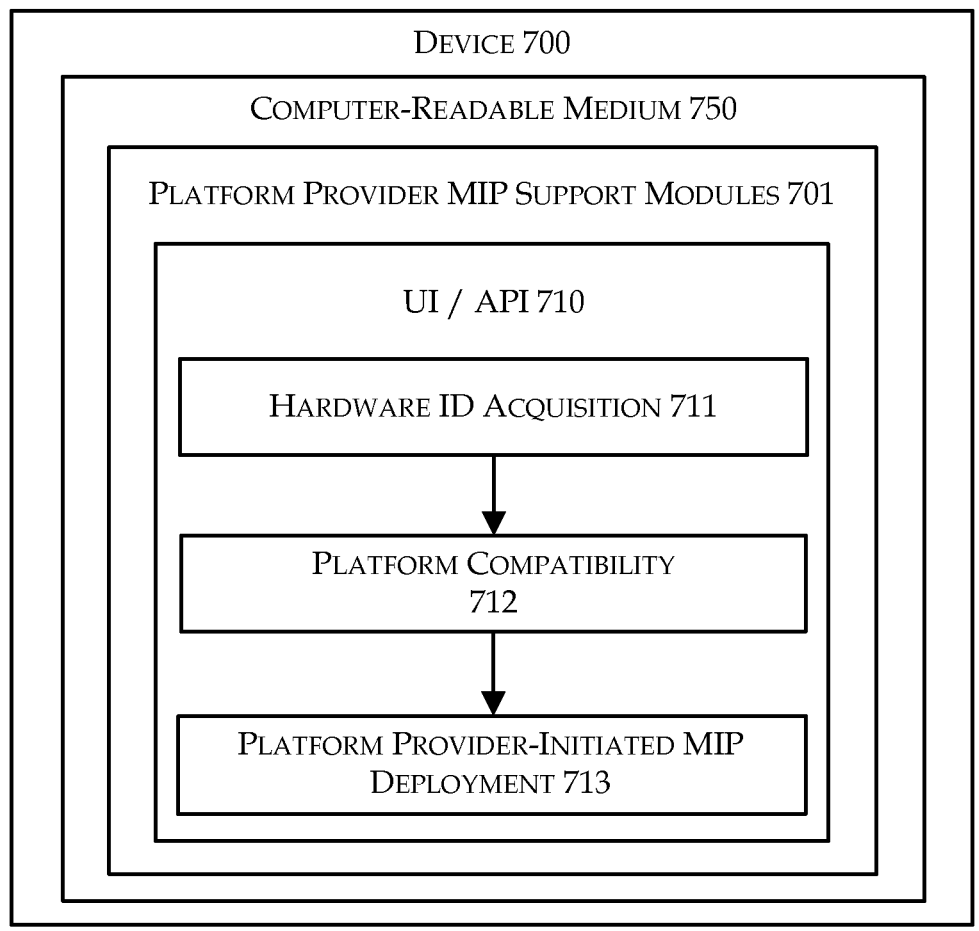
FIG. 7 is a flow diagram illustrating an example method that may be performed by a platform provider server device, all arranged in accordance with at least some embodiments of the present disclosure.

FIG. 7 is a flow diagram illustrating an example method that may be performed by platform provider server device 700, arranged in accordance with at least some embodiments of the present disclosure. The example flow diagram may include one or more operations/modules as illustrated by blocks 701 and 710-713, which represent operations as may be performed in a method, functional modules in a device 700, and/or instructions as may be recorded on a computer readable medium 750. The illustrated blocks 701 and 710-713 may be arranged to provide functional operations corresponding to one or more of "Platform Provider MIP Support Modules" at block 701, "UI/API" at block 710, "Hardware ID Acquisition" at block 711, "Platform Compatibility" at block 712, and/or "Platform Provider-Initiated MIP Deployment" at block 713.

In FIG. 7, blocks 701 and 710-713 are illustrated as being performed sequentially, with block 701 providing block 710, and block 710 providing blocks 711-713. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 7 illustrates an example method by which a platform provider server device 700, e.g., a device operated by platform provider 181 may support migration in place via interactions with platform customer 171 and infrastructure provider 100. For example, identified platform provider 181 may employ block 701 configured to receive migration in place related inquiries from platform customer 171, to support information gathering for potential migration in place operations, and to ultimately initiate or otherwise take part in migration in place deployment for identified software/data 123 within infrastructure provider 100.

In a "UI/API" block 710, one or more UI and/or API modules may be configured to receive incoming requests via a network, and to provide responses to received requests. Incoming requests may comprise, for example, migration in place inquires, platform compatibility requests, and/or migration in place deployment requests. Block 710 may be configured to pass received requests to one or more of blocks 711-713, or to otherwise initiate operations of one or more of blocks 711-713 in response to received requests. Block 710 may be configured provide responses to received requests, including response data generated by blocks 711-713, to a network, e.g., to a platform customer, platform customer application, or infrastructure provider that initiated a request. It will be appreciated that numerous UI and API configurations are possible and in general, UI and API configurations may comprise human and/or computer operable controls configured to interact with human users and applications, respectively, as described above. Block 710 may incorporate or interact with blocks 711-713.

In a "Hardware ID Acquisition" block 711, Platform Provider MIP Support Modules 701 may be configured to receive hardware IDs from platform customer 171, e.g., along with a request to determine platform provider compatibility with identified hardware. In some embodiments, block 711 may be configured to receive a platform customer migration in place inquiry that does not comprise hardware IDs, and to acquire hardware IDs from infrastructure provider 100 for the platform customer. For example, block 711 may be configured to generate a call to an infrastructure provider API identifying platform customer 171, and to receive hardware IDs corresponding to platform customer 171 in response to the call. Other methods for acquiring hardware IDs may also be employed, which methods are discussed above with reference to FIG. 5. Block 711 may be followed by block 712.

In a "Platform Compatibility" block 712, Platform Provider MIP Support Modules 701 may be configured to determine platform compatibility with hardware identified by received hardware IDs. In some embodiments, block 712 may be configured to generate a call to an infrastructure provider API such as 501, comprising hardware IDs for identified platform customer 171. Block 712 may be configured to receive compatibility information in response to the call, and to process received compatibility information to determine platform compatibility. When received compatibility information comprises a compatibility approval or denial, minimal processing is required of block 712. When received compatibility information comprises hardware properties, block 712 may be configured to compare received hardware properties to any platform requirements. In some embodiments, block 712 may be configured to respond to calls from infrastructure provider, e.g., from block 504, with information comprising platform requirements to support platform compatibility determinations by infrastructure provider 100. Block 712 may be followed by block 713.

In a "Platform Provider-Initiated MIP Deployment" block 713, Platform Provider MIP Support Modules 701 may be configured to receive a platform customer selection or authorization to deploy a platform in a migration in place operation. In response to the selection/authorization, block 713 may be configured to deploy a platform on platform customer's same hardware within infrastructure provider 100. Block 713 may send one or more of a migration in place request, platform deployment modules, e.g., platform B modules 152, hardware IDs, and/or a platform customer identifier, to infrastructure provider 100. Either infrastructure provider 100 or platform provider 182 may then proceed to deploy platform B 132 to platform customer hardware 106.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. An infrastructure provider method comprising:
providing, by the infrastructure provider, a plurality of servers at a data center having a physical location for use by a plurality of platform providers and platform customers, wherein:
each of the platform providers provides platform service modules, at one or more of the servers, for one or more platform customers; and
each of the platform customers is associated with platform customer data stored at one or more of the servers and supported by platform service modules of a platform provider selected by each platform customer;
receiving, by the infrastructure provider, a migration in place list request, wherein:
the migration in place list request comprises a platform customer identification, the platform customer identification identifying a platform customer, the identified platform customer being associated with platform customer data supported by platform service modules of a first platform provider; and the migration in place list request comprises a request to identify one or more second platform providers which are available to provide platform service modules to support the identified platform customer's data without migrating the identified platform customer's data outside of the data center;

determining, by the infrastructure provider, platform compatibility of platform service modules provided by a plurality of platform providers with one or more servers comprising the identified platform customer's data at the data center; and providing, by the infrastructure provider, in response to the migration in place list request, a migration in place list corresponding to the identified platform customer, wherein the migration in place list identifies one or more second platform providers which are available to provide platform service modules to support the identified platform customer's data without migrating the identified platform customer's data outside of the data center, wherein the migration in place list includes only platform providers that provide platform service modules determined to be compatible with the one or more servers comprising the identified platform customer's data, and wherein each of the one or more second platform providers identified in the migration in place list is selectable by the identified platform customer for a switch of the identified platform customer's data from support by platform service modules provided by the first platform provider to support by platform service modules provided by a selected one of the one or more second platform providers, without migrating the identified platform customer's data outside of the data center.

2. The infrastructure provider method of claim 1, wherein the migration in place list request comprises a request to identify one or more second platform providers which are available to provide platform service modules to support the identified platform customer's data without migrating the identified platform customer's data outside of a server row within the data center, and wherein the one or more second platform providers identified in the migration in place list comprise platform providers that are available to provide platform service modules to support the identified platform customer's data without migrating the identified platform customer's data outside of the server row within the data center.

3. The infrastructure provider method of claim 1, wherein the migration in place list request comprises a request to identify one or more second platform providers which are available to provide platform service modules to support the identified platform customer's data without migrating the identified platform customer's data outside of a server rack within the data center, and wherein the one or more second platform providers identified in the migration in place list comprise platform providers that are available to provide platform service modules to support the identified platform customer's data without migrating the identified platform customer's data outside of the server rack within the data center.

4. The infrastructure provider method of claim 1, wherein the migration in place list request comprises a request to identify one or more second platform providers which are available to provide platform service modules to support the identified platform customer's data without migrating the identified platform customer's data outside of one or more specific servers within the data center, and wherein the one or more second platform providers identified in the migration in place list comprise platform providers that are available to provide platform service modules to support the identified platform customer's data without migrating the identified platform customer's data outside of the one or more specific servers within the data center.

5. An infrastructure provider method comprising:

providing, by the infrastructure provider, a plurality of servers at a data center having a physical location for use by a plurality of platform providers and platform customers, wherein:
   each of the platform providers provides platform service modules, at one or more of the servers, for one or more platform customers; and
   each of the platform customers is associated with platform customer data stored at one or more of the servers and supported by platform service modules of a platform provider selected by each platform customer;

receiving, by the infrastructure provider, a migration in place list request, wherein:
   the migration in place list request comprises a platform customer identification, the platform customer identification identifying a platform customer, the identified platform customer being associated with platform customer data supported by platform service modules of a first platform provider; and
   the migration in place list request comprises a request to identify one or more second platform providers which are available to provide platform service modules to support the identified platform customer's data without migrating the identified platform customer's data outside of the data center;

providing, by the infrastructure provider, in response to the migration in place list request, a migration in place list corresponding to the identified platform customer, wherein the migration in place list identifies one or more second platform providers which are available to provide platform service modules to support the identified platform customer's data without migrating the identified platform customer's data outside of the data center, wherein each of the one or more second platform providers identified in the migration in place list is selectable by the identified platform customer for a switch of the identified platform customer's data from support by platform service modules provided by the first platform provider to support by platform service modules provided by a selected one of the one or more second platform providers, without migrating the identified platform customer's data outside of the data center;

receiving, by the infrastructure provider, a migration in place request, the migration in place request comprising an identification of a selected one of the one or more second platform providers identified in the migration in place list; and deploying, by the infrastructure provider, in response to the migration in place request, platform service modules of the selected one of the one or more second platform providers to one or more servers comprising the identified platform customer's data at the data center, in order to enable migrating the identified platform customer's data from a platform provided by the first platform provider to a platform provided by the selected second platform provider.

6. The infrastructure provider method of claim 5, further comprising directing, by the infrastructure provider, an increasing number of service calls associated with the identified platform customer to the platform provided by the selected one of the one or more second platform providers as the identified platform customer's data is migrated to the platform provided by the selected one of the one or more second platform providers.

7. The infrastructure provider method of claim 1, further comprising providing, by the infrastructure provider, a User Interface (UI) or Application Programming Interface (API) comprising a migration in place list request control, wherein the migration in place list request is received via the UI or API and the migration in place list is provided via the UI or API.

8. An infrastructure provider server for an infrastructure provider that provides hardware at a data center having a physical location, the hardware comprising a plurality of servers for a plurality of platform providers and platform customers, wherein each of the platform providers provides platform service modules, at one or more of the servers, for one or more platform customers, and wherein each of the platform customers is associated with platform customer data stored at one or more of the servers and supported by platform service modules of a platform provider selected by each platform customer, the infrastructure provider server comprising:
 a processor;
 a memory;
 a migration in place list request service module stored in the memory and executable by the processor, wherein the migration in place list request service module is configured to:
  receive a migration in place list request, wherein:
   the migration in place list request comprises a platform customer identification, the platform customer identification identifying a platform customer, the identified platform customer being associated with platform customer data supported by platform service modules of a first platform provider; and
   the migration in place list request comprises a request to identify one or more second platform providers which are available to provide platform service modules to support the identified platform customer's data without migrating the identified platform customer's data outside of the data center; and
  provide, in response to the migration in place list request, a migration in place list corresponding to the identified platform customer, wherein the migration in place list identifies one or more second platform providers which are available to provide platform service modules to support the identified platform customer's data without migrating the identified platform customer's data outside of the data center, wherein each of the one or more second platform providers identified in the migration in place list is selectable by the identified platform customer for a switch of the identified platform customer's data from support by platform service modules provided by the first platform provider to support by platform service modules provided by a selected one of the one or more second platform providers, without migrating the identified platform customer's data outside of the data center; and
 a platform compatibility module stored in the memory and executable by the processor, wherein the platform compatibility module is configured to:
  determine platform compatibility of platform service modules provided by a plurality of platform providers with one or more servers comprising the identified platform customer's data at the data center; and
  include, in the migration in place list, only platform providers that provide platform service modules determined to be compatible with the one or more servers comprising the identified platform customer's data.

9. The infrastructure provider server of claim 8, wherein the migration in place list request comprises a request to identify one or more second platform providers which are available to provide platform service modules to support the identified platform customer's data without migrating the identified platform customer's data outside of a server row within the data center, a server rack within the data center, or one or more specific servers within the data center, and wherein the one or more second platform providers identified in the migration in place list comprise platform providers that are available to provide platform service modules to support the identified platform customer's data without migrating the identified platform customer's data outside of the data center, the server row within the data center, the server rack within the data center, or the one or more specific servers within the data center.

10. An infrastructure provider server for an infrastructure provider that provides hardware at a data center having a physical location, the hardware comprising a plurality of servers for a plurality of platform providers and platform customers, wherein each of the platform providers provides platform service modules, at one or more of the servers, for one or more platform customers, and wherein each of the platform customers is associated with platform customer data stored at one or more of the servers and supported by platform service modules of a platform provider selected by each platform customer, the infrastructure provider server comprising:
 a processor;
 a memory;
 a migration in place list request service module stored in the memory and executable by the processor, wherein the migration in place list request service module is configured to:
  receive a migration in place list request, wherein:
   the migration in place list request comprises a platform customer identification, the platform customer identification identifying a platform customer, the identified platform customer being associated with platform customer data supported by platform service modules of a first platform provider; and
   the migration in place list request comprises a request to identify one or more second platform providers which are available to provide platform service modules to support the identified platform customer's data without migrating the identified platform customer's data outside of the data center; and
  provide, in response to the migration in place list request, a migration in place list corresponding to the identified platform customer, wherein the migration in place list identifies one or more second platform providers which are available to provide platform service modules to support the identified platform customer's data without migrating the identified platform customer's data outside of the data center, wherein each of the one or more second platform providers identified in the migration in place list is selectable by the identified platform customer for a switch of the identified platform customer's data from support by platform service modules provided by the first platform provider to support by platform service modules provided by a selected one of the one or more second platform providers, without migrating the identified platform customer's data outside of the data center; and a migration in place deployment module stored in the memory and executable by the processor, wherein the migration in place deployment module is configured to:
receive a migration in place request, the migration in place request comprising an identification of a selected one of the one or more second platform providers identified in the migration in place list; and
deploy, in response to the migration in place request, platform service modules of the selected one of the one or more second platform providers to one or more servers comprising the identified platform customer's data at the data center, in order to enable migrating the identified platform customer's data from a platform provided by the first platform provider to a platform provided by the selected second platform provider.

11. The infrastructure provider server of claim 10, further comprising a Session Border Controller (SBC) module stored in the memory and executable by the processor, wherein the SBC module is configured to direct an increasing number of service calls associated with the identified platform customer to the platform provided by the selected one of the one or more second platform providers as the identified platform customer's data is migrated to the platform provided by the selected one of the one or more second platform providers.

12. The infrastructure provider server of claim 8, further comprising a User Interface (UI) or Application Programming Interface (API) module stored in the memory and executable by the processor, wherein the UI or API module is configured to:
provide a UI or API comprising a migration in place list request control;
receive the migration in place list request via the migration in place list request control; and
provide the migration in place list via the UI or API.

13. A non-transitory computer readable storage medium for an infrastructure provider that provides hardware at a data center having a physical location, the hardware comprising a plurality of servers for a plurality of platform providers and platform customers, wherein each of the platform providers provides platform service modules, at one or more of the servers, for one or more platform customers, and wherein each of the platform customers is associated with platform customer data stored at one or more of the servers and supported by platform service modules of a platform provider selected by each platform customer, the non-transitory computer readable storage medium having computer executable instructions executable by a processor, the instructions that, when executed by the processor, cause the processor to:
receive a migration in place list request, wherein:
the migration in place list request comprises a platform customer identification, the platform customer identification identifying a platform customer, the identified platform customer being associated with platform customer data supported by platform service modules of a first platform provider; and
the migration in place list request comprises a request to identify one or more second platform providers which are available to provide platform service modules to support the identified platform customer's data without migrating the identified platform customer's data outside of the data center;
determine platform compatibility of platform service modules provided by a plurality of platform providers with one or more servers comprising the identified platform customer's data at the data center; and
provide, in response to the migration in place list request, a migration in place list corresponding to the identified platform customer, wherein the migration in place list identifies one or more second platform providers which are available to provide platform service modules to support the identified platform customer's data without migrating the identified platform customer's data outside of the data center, wherein the migration in place list includes only platform providers that provide platform service modules determined to be compatible with the one or more servers comprising the identified platform customer's data, and wherein each of the one or more second platform providers identified in the migration in place list is selectable by the identified platform customer for a switch of the identified platform customer's data from support by platform service modules provided by the first platform provider to support by platform service modules provided by a selected one of the one or more second platform providers, without migrating the identified platform customer's data outside of the data center.

14. The non-transitory computer readable storage medium of claim 13, wherein the migration in place list request comprises a request to identify one or more second platform providers which are available to provide platform service modules to support the identified platform customer's data without migrating the identified platform customer's data outside of a server row within the data center, a server rack within the data center, or one or more specific servers within the data center, and wherein the one or more second platform providers identified in the migration in place list comprise platform providers that are available to provide platform service modules to support the identified platform customer's data without migrating the identified platform customer's data outside of the data center, the server row within the data center, the server rack within the data center, or the one or more specific servers within the data center.

15. A non-transitory computer readable storage medium for an infrastructure provider that provides hardware at a data center having a physical location, the hardware comprising a plurality of servers for a plurality of platform providers and platform customers, wherein each of the platform providers provides platform service modules, at one or more of the servers, for one or more platform customers, and wherein each of the platform customers is associated with platform customer data stored at one or more of the servers and supported by platform service modules of a platform provider selected by each platform customer, the non-transitory computer readable storage medium having computer executable instructions executable by a processor, the instructions that, when executed by the processor, cause the processor to:
receive a migration in place list request, wherein:
the migration in place list request comprises a platform customer identification, the platform customer identification identifying a platform customer, the identified platform customer being associated with platform customer data supported by platform service modules of a first platform provider; and
the migration in place list request comprises a request to identify one or more second platform providers which are available to provide platform service modules to support the identified platform customer's data without migrating the identified platform customer's data outside of the data center;

provide, in response to the migration in place list request, a migration in place list corresponding to the identified platform customer, wherein the migration in place list identifies one or more second platform providers which are available to provide platform service modules to support the identified platform customer's data without migrating the identified platform customer's data outside of the data center, wherein each of the one or more second platform providers identified in the migration in place list is selectable by the identified platform customer for a switch of the identified platform customer's data from support by platform service modules provided by the first platform provider to support by platform service modules provided by a selected one of the one or more second platform providers, without migrating the identified platform customer's data outside of the data center;

receive a migration in place request, the migration in place request comprising an identification of a selected one of the one or more second platform providers identified in the migration in place list; and deploy, in response to the migration in place request, platform service modules of the selected one of the one or more second platform providers to one or more servers comprising the identified platform customer's data at the data center, in order to enable migrating the identified platform customer's data from a platform provided by the first platform provider to a platform provided by the selected second platform provider.

16. The non-transitory computer readable storage medium of claim 13, wherein the instructions cause the processor to:
provide a UI or API comprising a migration in place list request control;
receive the migration in place list request via the migration in place list request control; and
provide the migration in place list via the UI or API.

* * * * *